Sept. 6, 1966 A. C. DE ROSA 3,271,517

DATA TRANSMISSION

Filed Jan. 2, 1963

5 Sheets-Sheet 1

INVENTOR,
ANDREW C. DE ROSA.
BY
Harry M. Saragovitz
ATTORNEY.

Sept. 6, 1966 A. C. DE ROSA 3,271,517

DATA TRANSMISSION

Filed Jan. 2, 1963 5 Sheets-Sheet 2

INVENTOR,
ANDREW C. DE ROSA.

BY Harry M. Saragovitz

ATTORNEY.

Sept. 6, 1966 A. C. DE ROSA 3,271,517

DATA TRANSMISSION

Filed Jan. 2, 1963 5 Sheets-Sheet 3

INVENTOR,
ANDREW C. DE ROSA.

BY Harry M. Saragovitz

ATTORNEY

Sept. 6, 1966 A. C. DE ROSA 3,271,517

DATA TRANSMISSION

Filed Jan. 2, 1963

5 Sheets-Sheet 4

INVENTOR,
ANDREW C. DE ROSA.

BY Harry M. Saragovitz

ATTORNEY.

INVENTOR,
ANDREW C. DE ROSA.
BY Harry M. Saragovitz
ATTORNEY.

3,271,517

DATA TRANSMISSION

Andrew C. De Rosa, Hazlet, N.J., assignor to the United States of America as represented by the Secretary of the Army Filed Jan. 2, 1963, Ser. No. 249,101
5 Claims. (Cl. 178—26)

The invention described herein may be manufactured and used by or for the Government for governmental purposes without the payment of any royalty thereon.

The present invention relates to code transmission and more particularly to a method and apparatus whereby one type of code may be transmitted over transmission facilities designed for another type of code without the need for complex translating devices at each terminal of the system.

U.S. Army data processing equipment is designed for the eight bit per character Fieldata code. In this code, one hundred and twenty-eight different characters are represented by different combinations of the eight bits. The code is normally transmitted and used in parallel form, that is, each bit is sent over a separate line, so that an entire character of eight bits may be transmitted or processed simultaneously. Each bit consists of either a mark or space and is indicated by the presence or absence of a D.C. voltage on one of the eight lines. The transmission and use of Fieldata in parallel form results in high speed processing the large volume of data required by a modern army and also makes efficient use of the high speed capabilities of the modern computers which process the Fieldata information. At present no extensive long distance transmission facilities exist for the direct interchange of Fieldata information between the many army computation and data gathering centers throughout the world. By means of the present invention, Fieldata may be transmitted over the wordwide network of military and commercial teletypewriter transmission facilities without the use of complex code converters or translators at each teletypewriter terminal. In the past when it was desired to transmit one type of code over a network designed for a second type of code, the sequence of the bits which was characteristic of the first code was re-arranged or translated according to a predetermined rule to render the information compatible with the transmission facility. At the receiving end it was necessary to re-translate the information back to its original form before it could be utilized. This translation and re-translation requires complex equipment, such as is exemplified by that shown in U.S. Patent 2,927,158, issued March 1, 1960. The use of such equipment to translate the parallel eight bit per character Fieldata to the serial five bit per character teletypewriter code is further complicated by the fact that there are many more bit combinations or characters possible with Fieldata.

Figure 4:
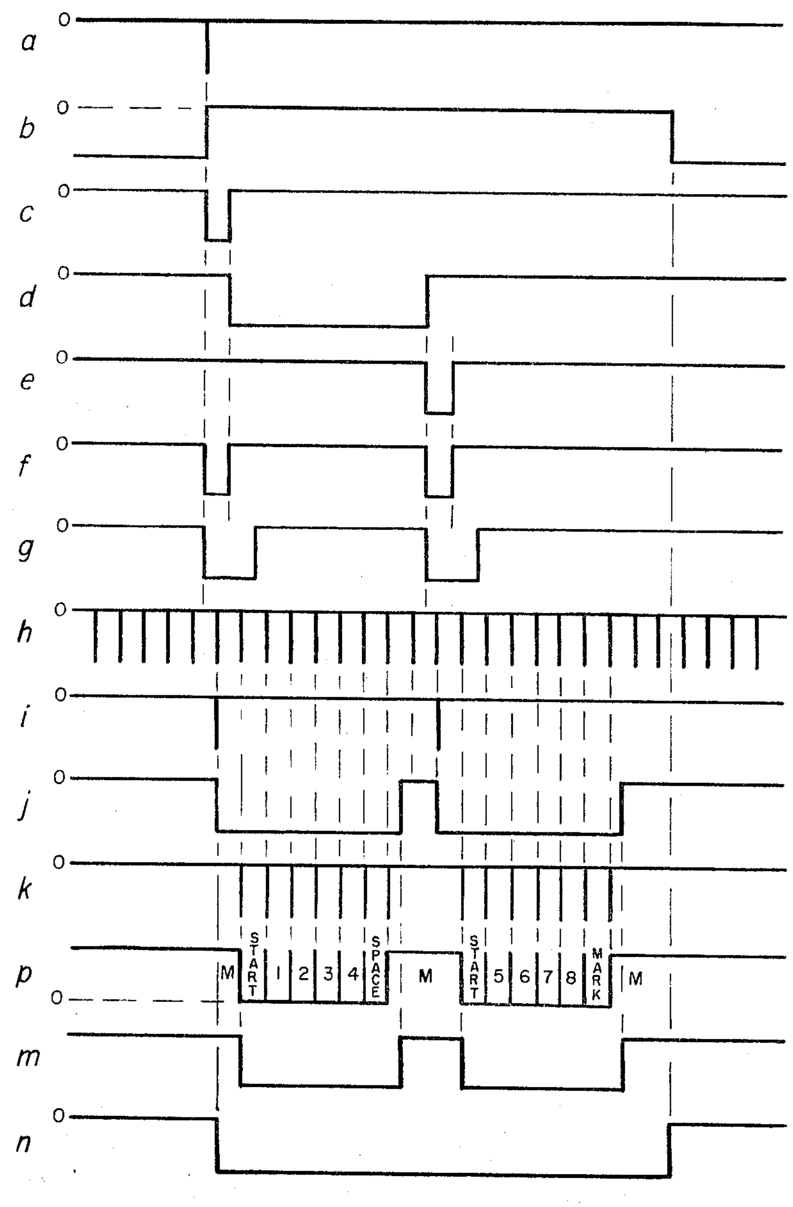
Figure 5:
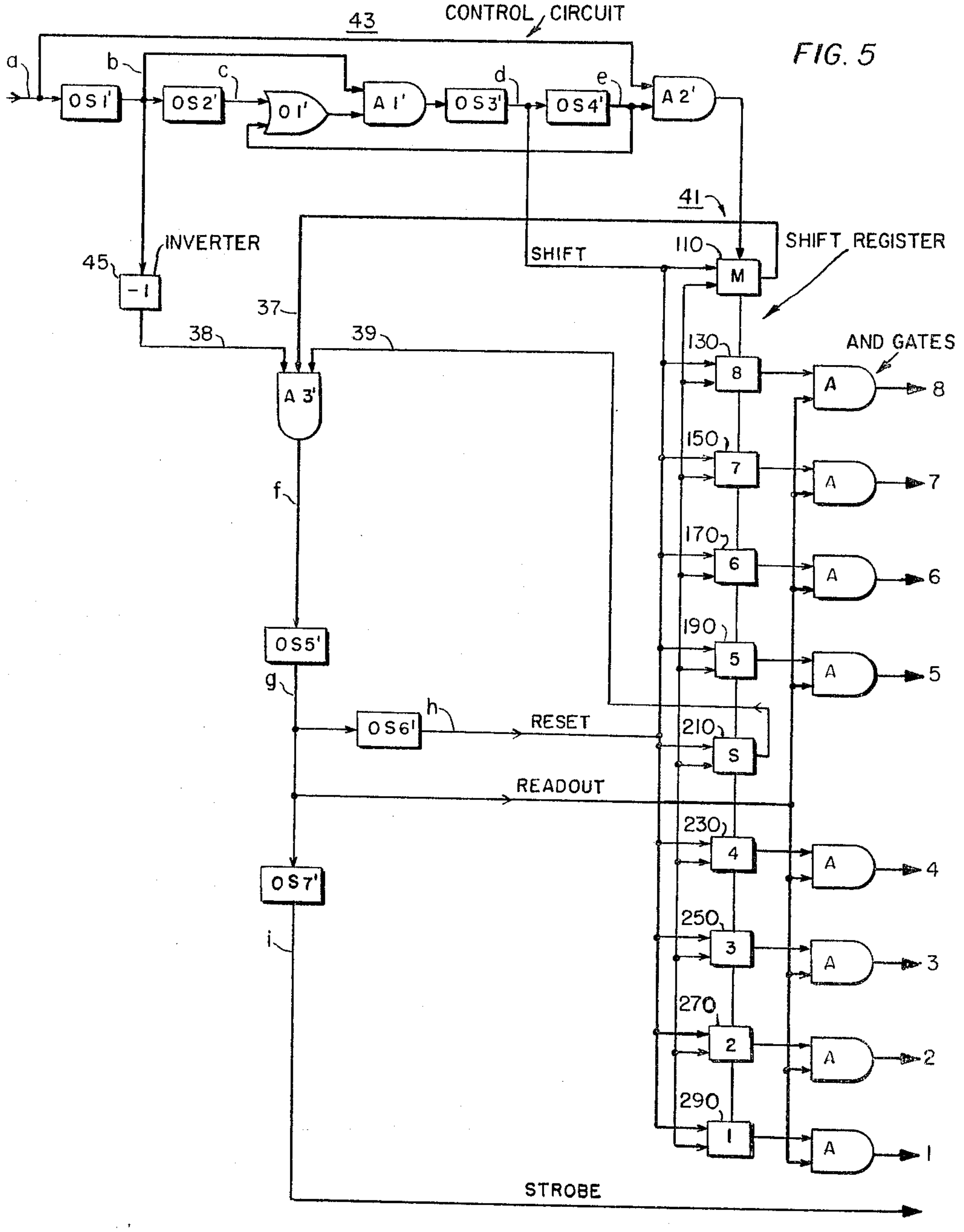
Figure 6:
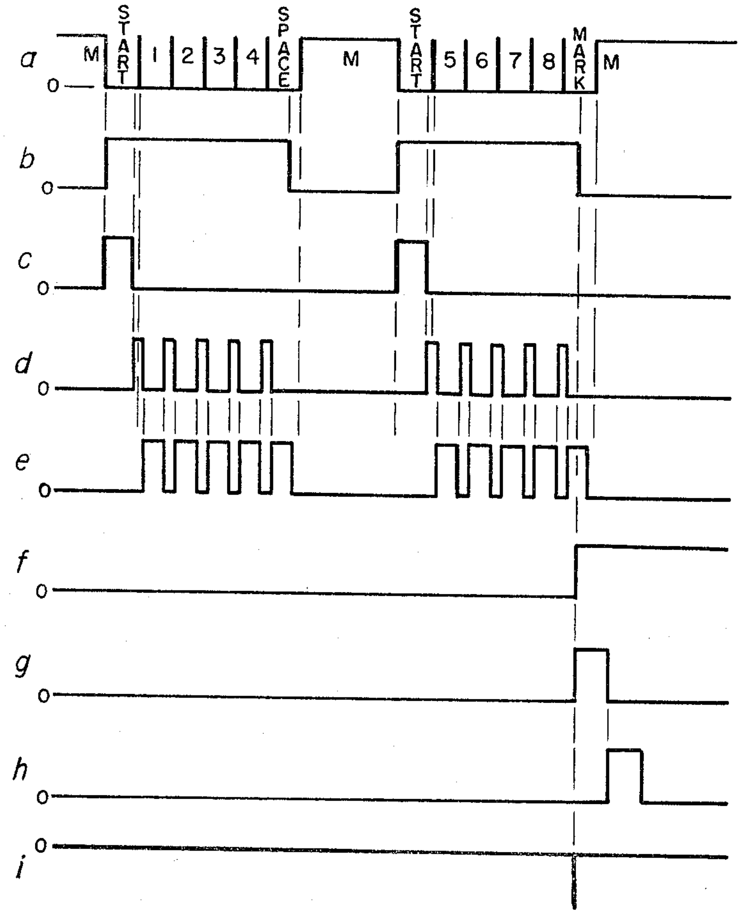

Briefly stated, the present invention solves these promblems by converting the parallel Fieldata into serial form, splitting the eight bit Fieldata characters into two four bit subcharacters, adding a "dummy" bit of one type to the first four bit subcharacter and a dummy bit of the opposite type to the second subcharacter to form two five subcharacters which may be transmitted over any teletypewriter nework. The invention also provides novel circuitry for generating standard teletypewriter synchronizing or start-stop pulses which render the information compatible with any teletypewriter network. After transmission over the teletypewriter network, the receiving equipment provides circuitry for serially feeding each group of two subcharacters in a ten stage shift register for conversion back to parallel eight bit Fieldata. The two added dummy bits which form the fifth bit of each subcharacter provide a means to automatically indicate when the register is full and initiate the parallel readout thereof. The invention will be better understood with reference to the following detailed description and drawings, in which FIG. 1 shows how the invention is tied in with a teletypewriter network, FIG. 2 is a schematic representation of the novel method of code transmission, FIG. 3 is a block diagram of the transmitting terminal equipment required in the system of FIG. 1, FIG. 4 illustrates waveforms in various parts of FIG. 3, FIG. 5 is a block diagram of the receiving terminal equipment required in the system of FIG. 1, FIGURE 6 is a series of waveforms illustrating the operation of the invention.

Figure 1:
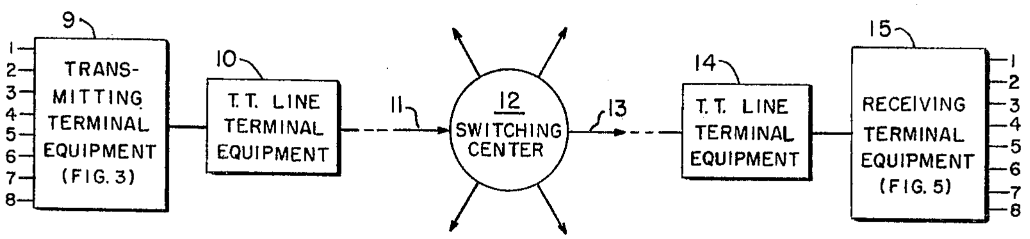
Figure 2:
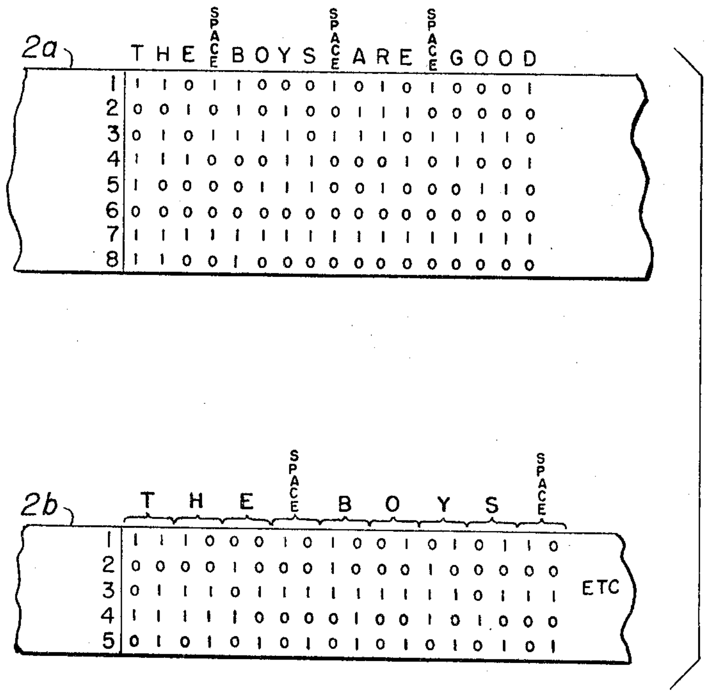

Referring now to FIG. 1, there is shown therein a block diagram illustrating how the present invention may be used to transmit Fieldata over a teletypewriter network. The parallel Fieldata is fed into transmitting terminal equipment 9 on eight parallel lines. In element 9, which is shown in detail in FIG. 3, the Fieldata is converted to serial form, split into two standard five bit teletype subcharacters, provided with the required synchronizing pulses and then fed to standard teletypewriter line terminal equipment 10, from which it is sent out over teletypewriter line 11. The teletypewriter network may contain a switching center 12, from which further teletypewriter lines radiate. Switching center 12 may also contain reperforators or teletypewriter repeaters. After further transmission over line 13, the information is applied to teletypewriter line terminal equipment 14 at the receiving end. From element 14, the information is fed in serial form to receiving terminal equipment 15, shown in greater detail in FIG. 5, wherein it is re-arranged in Fieldata format and fed to further utilization equipment on eight parallel lines.

FIG. 2*a* is a schematic representative of a given message coded in Fieldata format and FIG. 2*b* shows how this same message would appear during transmission over a teletypewriter network. For example, the first four bits of the letter "T" in Fieldata comprise the first four bits of the first teletypewriter subcharacter, the fifth or dummy bit of which is arbitrarily made "0" or space. The second half of the letter "T" comprises the first four bits of the second teletypewriter subcharacter and a "1" or mark comprises the dummy bit thereof. This alternate sequence of 0 and 1 for the fifth bit of each teletypewriter subcharacter aids in re-assembling the data into proper form at the receiving terminal as will be apparent from the circuitry described below.

Figure 3:
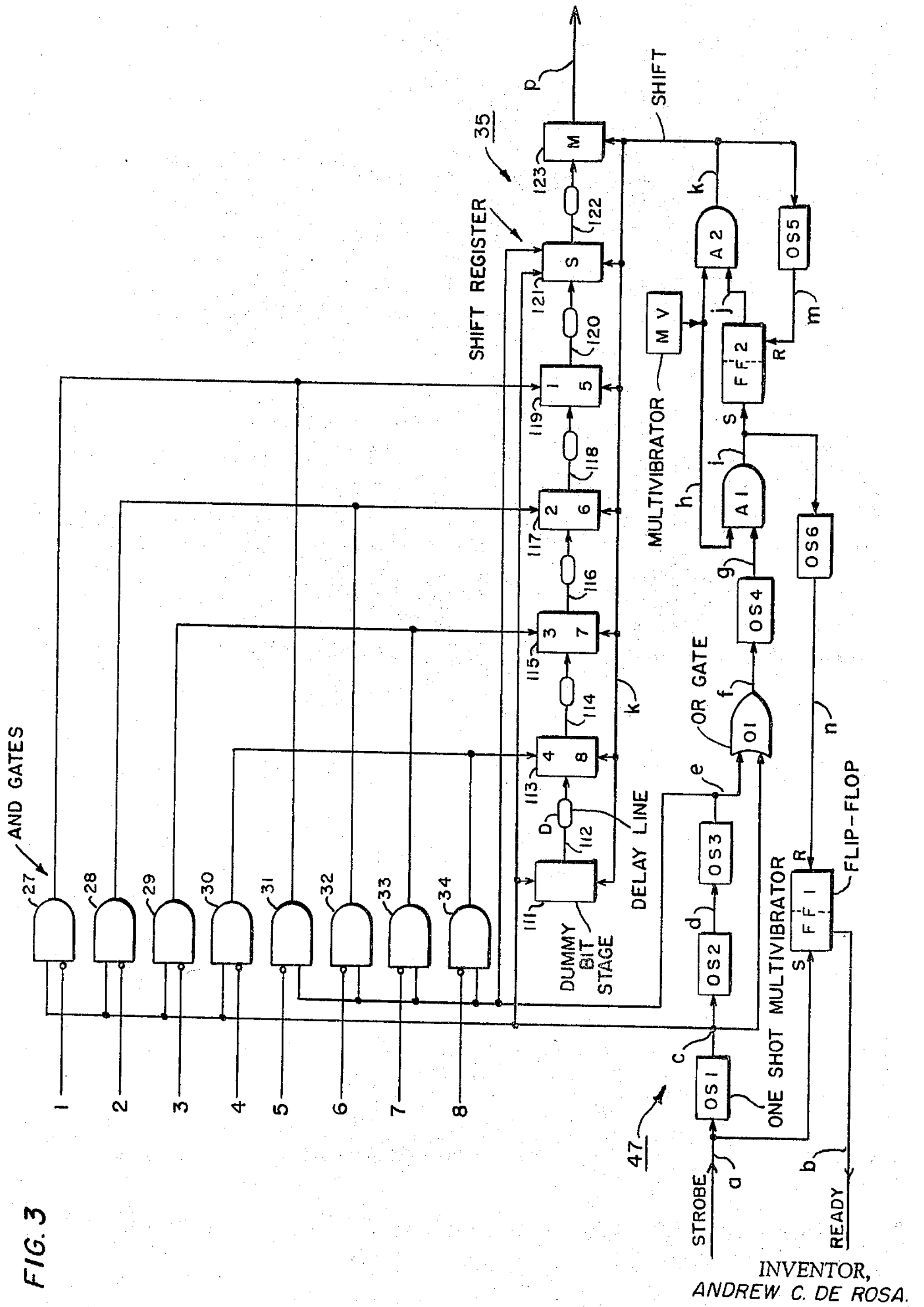

Referring now to FIG. 3, the Fieldata is applied as one input of each of AND gates 27–34 over lines 1–8. A "1" or mark is indicated by the presence of a positive D.C. voltage and a "0" or space by the absence of any voltage on lines 1–8. Each Fieldata character is applied to shift register 35 in two sequential groups of four bits each. The AND gates 27–34 and shift register 35 are controlled by control circuit 47. In FIGS. 3 and 5 the abbreviation "OS" represents a one-shot or monostable multivibrator, "O" represents an OR gate, "A" an AND gate, "FF" a flip-flop or bistable multivibrator and "MV" a free running or astable multivibrator. The shift register 35 comprises seven stages 111, 113, 115, 117, 119, 121, and 123. Shifting pulses are applied thereto over link *k* from control circuit 47 and the data is fed to 35 from the outputs of AND gates 27–34. AND gates 27–30 apply Fieldata bits 1 to 4 to stages 119, 117, 115, 113 respectively of shift register 35. The register is then shifted to feed this data to line *p* in serial form, the fifth bit of the subcharacter being provided by the stage 111 and the standard teletypewriter start and stop pulses being provided by stages 121 and 123. After transmission of the first subcharacter, the AND gates 31–34 apply Fieldata bits 5 to 8 to stages 119, 117, 115 and 113 respectively of the shift register to form the second subcharacter. The structure of shift register 35 is conventional except that each shift pulse on line *k* sets each stage, that is, it provides a positive voltage at the output of each stage. The reason for this type of shifting will become apparent. The data is transferred or shifted from stage to stage via delay means "D" in conventional fashion.

When the Fieldata is present on lines 1–8, the Fieldata circuitry provides a strobe pulse, FIG. 4*a*. This pulse triggers OS1 and sets FF1. The output of OS1, FIG. 4*c*, is fed as a gating signal to each of AND gates 27–30. The output of FF1, FIG. 4*b*, is fed back to the Fieldata circuitry and acts as a confirmatory signal. It should be noted that all of the shift register stages are initially in the set or mark state. All of the Fieldata is inverted before application to the AND gates 27–34; this is indicated by the small circle at each of the data inputs of these gates. The pulse *c* from OS1 opens each of the four AND gates 27–30. Due to the inversion of the Fieldata, ones or marks on any of the lines 1 to 4 will produce no output from its associated AND gate and will therefore not alter the state of the shift register stage connected thereto. Zeros or spaces in the Fieldata, however will produce outputs from the AND gates and these output pulses will reset the register stages connected thereto to zeros or space. The output of OS1, *c* is also fed to register stages 111 and 121, resetting each to zero. The stage 111 therefore provides the zero which forms the fifth bit of the first subcharacter. The stage 121 provides the space which forms the start pulse or bit of the teletypewriter character. The stage 123, being initially in the set or mark state, provides the stop or rest pulse of the teletypewriter character. It can be seen that the register is now ready to feed the first subcharacter onto the output line, *p*. In order to accomplish this, the output of OS1, *c*, is applied through OR gate O1 to OS4, which generates a pulse, *g*, which forms one input of AND gate A1. The other input of A1 is the output, *h*, of multivibrator, MV, shown in FIG. 4*h*. The output of MV is a train of pulses with an interpulse period of approximately 22 milliseconds. This period determines the bit rate at which the contents of the register are fed out over line *p* and corresponds to the standard teletypewriter transmission rate of 60 words per minute. The output of OS4 opens gate A1 and applies at least one pulse, *i*, from MV to the set input of FF2. This pulse sets FF2 and thereby produces a negative pulse at the output thereof, shown at *j*. This pulse opens AND gate A2 and thereby applies the pulse train output of MV to the register shift line *k*. Seven shift pulses are required to empty the shift register. The first shift pulse from A2 is also used to trigger OS5, which generates a pulse shown in FIG. 4*m*. This pulse is adjusted to have a duration of approximately 6½ teletype bits or 143 milliseconds. The output of OS5 is fed to the reset input of FF2. The positive-going or trailing edge of the output of OS5 resets FF2 thereby closing AND gate A2 after seven shift pulses have been fed from MV to the shift line. The resultant output of shift register 35 is shown at FIG. 4*p*. In FIG. 4*p* the line voltage is normally positive during rest or stop periods, and this positive voltage is provided by the register stage 123 which is normally in the mark or one state and is directly connected to output line *p*. This is the reason for resetting register 35 to the one or mark state. The first shift pulse on line *k* shifts the zero from stage 121 to output stage 123 and places the zero "start" pulse on the output line. Succeeding shift pulses place the data bits 1, 2, 3, and 4 sequentially on the output line. The sixth shift pulse places the dummy space pulse from stage 111 on the output line and the seventh pulse resets all the register stages to the one or mark stage, thereby applying a mark from stage 124 to the output line *p* and preparing the register for the next subcharacter. The output of OS1, *c*, is also fed to OS2 which is adjusted to have a pulse length, FIG. 4*d*, which is slightly longer than a standard teletypewriter character. The trailing edge or positive-going portion of the output of OS2 triggers OS3 which generates pulse *e*, which is applied to AND gates 31–34, opening these gates and applying the Fieldata on lines 5–8 to register stages 119, 117, 115 and 113 respectively. The output of OS3 is also applied to register stage 121, resetting this stage to zero to provide the start pulse for the second subcharacter. It should be noted that register stage 111 is unaffected by the output of OS3 and therefore remains in the set or mark condition to provide the dummy mark bit of the second subcharacter. The output of OS3 is also fed through OR gate C1 and proceeds through the remainder of the control circuit 47 in the same manner as did the output of OS1, thereby generating the required number of properly spaced shift pulses to apply the contents of the register to the output line in sequential or serial fashion. The second subcharacter containing Fieldata bits 5–8 is also shown in FIG. 4*p*.

The output of AND gate A1 is also applied to OS6, which generates a pulse, *n*, which is slightly longer than two standard teletypewriter characters. The trailing edge or positive-going portion of this waveform resets FF1. The resetting of FF1 indicates to the preceding Fieldata equipment that the next character should be fed over lines 1–8. The above procedure is then repeated for each Fieldata character.

The signal is then sent over the teletypewriter network as indicated in FIG. 1 and applied in serial form to the receiving terminal equipment of FIG. 5 where it is reassembled in parallel Fieldata form. In FIG. 5 the shift register 41 comprises a means for converting groups of two serial teletypewriter subcharacters to parallel Fieldata. The control circuitry 43 comprises a novel means for sampling the teletypewriter signal only during the data carrying bits or portions thereof and feeding these bits to the shift register. The control circuit 43 in effect comprises a self-synchronous sampling circuit. The shift register is similar to that of FIG. 3 except that each stage is reset to the zero state by the reset and shift signals. It should be noted that delay means are provided between the stages of the shift register 41 but these have been omitted from FIG. 5 for clarity. The incoming teletypewriter signal, FIG. 6*a*, is applied to OS1′. OS1′ is triggered by negative-going pulses and will therefore be triggered by the leading edge of the start space pulse of the first subcharacter. OS1′ is designed to produce a positive pulse, FIG. 6*b*, of approximately 5½ bit lengths, or approximately 121 milliseconds. The output of OS1′ is applied to OS2′ and the leading edge or positive-going portion thereof triggers OS2′, which then generates a pulse, FIG. 6*c*, which is slightly narrower than the standard teletypewriter time slot or bit. The output of OS2′ forms one input of OR gate O1′. The output of O1′ forms one input of AND gate A1′, the other input of which is the output, *b*, of OS1′. The output of A1′ is fed to OS3′ which is triggered by negative-going inputs. The output of OS3′, *d*, is applied to the input of OS4′, which is also triggered by negative-going inputs. The output of OS4′, *e*, forms one input of AND gate A2′ and is also fed back to form the second input of OR gate O1′. The second input of A2′ comprises the input teletypewriter signal, *a*. At the end of the first pulse of waveform *c*, the output of A1′ will drop to zero, thereby triggering OS3′, which then generates the first pulse of waveform *d*. The trailing edge of this pulse will then in turn trigger OS4′ and generate the first pulse of waveform *e*. The width of the output pulses of OS4′ is adjusted to be approximately the same as the width of the output of OS2′. By virtue of the feedback path from the output of OS4′ to O1, the first pulse of waveform *e* will be recirculated through O1′ and A1′ and the trailing edge thereof will trigger OS3′, which then produces the second pulse of waveform *d* and this pulse in turn generates the second pulse of waveform *e*. This circulation of pulses around the feedback path continues as long as gate A1′ is held open by the application of the output of OS1′ thereto. As shown in FIG. 6, the output of OS1′ resets and returns to zero sometime during the generation of the fifth pulse produced by OS4′. This closes the gate A1′ until the next subcharacter is received. The five pulses generated by OS4′ during each subcharacter comprise sampling or self-synchronized clock pulses which are applied to A2′ to sample the input signal *a* only during the five data-bearing time slots therein. It should be noted that the combined duration of the pulses generated by OS2′ and OS3′ is approximately that of one teletypewriter bit. The output of A2′ applies the sampled bits to register 41. It can be seen from FIG. 6 that the first sampling pulse, *e*, coincides with the first data bit of waveform *a*, the second sampling pulse with the second data bit, etc. The output of OS3′ also provides the shift pulses for register 41. Thus the first four bits of the Fieldata are serially fed to the register 41, together with the space dummy bit which forms the fifth bit of the first subcharacter. When the start space bit of the second subcharacter arrives at the input of OS1′, the above cycle is repeated. After the five bits of the second subcharacter have been fed into register 41, the eight bit Fieldata character will be completely re-assembled therein, the first bit thereof being in stage 290, the second bit in stage 270, etc. as indicated by the numerals in the various register stages. Register stage 210 contains the dummy space bit which comprises the fifth bit of the first subcharacter and stage 110 the dummy mark bit which comprises the fifth bit of the second subcharacter. The presence of these two bits in their respective register stages is used to initiate the readout and resetting of the register. Each of the register stages containing a Fieldata bit is connected to one input of an AND gate, A, as illustrated. AND gate A3′ has three inputs. Input 37 of A3′ is connected to the set output of register stage 110, input 38 is connected to the output of inverter 45, which is in turn connected to the output of OS1′, input 39 of A3′ is connected to the reset output of register stage 210. When the register is full, positive voltages will appear on A3′ inputs 37 and 39 due to the presence of the space and mark signals in register stages 210 and 110, respectively. Simultaneously, the resetting of OS1′ at the end of the second subcharacter will cause the output of inverter 45 to rise, thereby producing a positive output from 43′, FIG. 6*f*. This pulse triggers OS5′ which produces a readout pulse, FIG. 6*g*, which is fed to all of the eight AND gates connected to the shift register. This pulse opens all of the AND gates and transfers the data in the associated register stages in parallel form to lines 1–8. The trailing edge of the readout pulse triggers OS6′ which generates a reset pulse, FIG. 6*h*, which resets all of register stages in preparation for the next character. The leading edge of the output of OS5′ is also arranged to trigger OS7′, which produces a two microsecond strobe pulse, FIG. 6*i*, which is fed to the succeeding Fieldata circuitry.

While a specific embodiment of the invention has been shown and described, many modifications and alternate embodiments will occur to one skilled in the art, accordingly, the invention should be limited only by the scope of the appended claims.

What is claimed is:

1. A means for transmitting binary information coded in eight bit per character parallel form over standard teletypewriter networks, comprising; transmitting terminal equipment including a seven stage shift register, means to sequentially apply two parallel four bit groups of the eight bit code to four stages of said shift register, means to apply a dummy bit to one stage of said register with each of said four bit groups to form two five bit subcharacters from each eight bit character, the two remaining register stages being arranged to provide the standard teletypewriter start and stop signals, a control circuit arranged to sequentially control the application of said four bit groups to said register and to generate seven equally spaced shifting pulses for serially applying each subcharacter from said register to a teletypewriter network; receiving terminal equipment connected to a remote terminal of said teletypewriter network including, means to feed the incoming teletypewriter line signal to one input of an AND gate, means controlled by said line signal to generate five sampling pulses coinciding with the five data-bearing time slots of each subcharacter of said line signal, means to apply said sampling pulses to the other input of said AND gate, means to feed the output of said AND gate to the first stage of a ten stage shift register, means controlled by said input line signal for shifting the data-bearing bits therein along said ten stage register, and means controlled by the presence of said dummy bits in the first and sixth stages of said ten stage register to initiate the parallel readout of the eight bit code from the other eight stages of said ten stage register.

2. A means for transmitting binary information coded in eight bit per character parallel form over standard teletypewriter networks, comprising; means to form a first five bit subcharacter from the first four bits of each eight bit character plus a dummy bit of one type, means to provide said first five bit subcharacter with a standard teletype synchronizing pulses and means to apply said first five bit subcharacter serially to a teletypewriter network, means to form a second five bit subcharacter from the last four bits of each eight bit charcater plus a dummy bit of a second or opposite type, means to provide said second five bit subcharacter with standard teletypewriter synchronizing pulses and means to apply said second five bit subcharacter serially to said teletypewriter network, and means at a remote terminal of said teletypewriter network for re-assembling said first and second subcharacters into a parallel eight bit character.

3. A means for transmitting eight bit per parallel character Fieldata over standard teletypewriter networks, comprising; means to split the information in each Fieldata character equally between two subcharacters of standard teletypewriter form, means to insert a dummy bit as the fifth bit of each of said teletypewriter subcharacters, means to provide said teletypewriter subcharacters with synchronizing pulses, means to serially apply said teletypewriter subcharacters to a teletypewriter network, means at a remote terminal of said teletypewriter network for re-assembling each group of two serial teletypewriter subcharacters into parallel Fieldata form.

4. A means for transmitting parallel eight bit per character binary code over standard teletypewriter networks, comprising; transmitting terminal equipment including a seven stage shift register, eight AND gates, means to feed a separate bit of said eight bit code to each of said eight AND gates, the first four of said eight AND gates having second inputs connected to the output of a first one-shot multivibrator and the second four of said eight AND gates having second inputs connected to the output of a second one-shot multivibrator, the outputs of said first four of said AND gates being connected respectively to the third, fourth, fifth and sixth stages of said seven stage shift register, the outputs of said second four of said AND gates being likewise connected to the third, fourth and fifth and sixth stages of said seven stage shift register, the output of said first one-shot multivibrator being also connected to the second and seventh stages of said shift register and the output of said second one-shot multivibrator being also connected to the second stage of said shift register, means to delay the output of said second one-shot multivibrator relative to the output of said first one-shot multivibrator by a time interval slightly longer than the character length of a standard teletypewriter signal, the outputs of each of said one-shot multivibrators being connected to separate inputs of an OR gate, means connected to the output of said OR gate to generate a series of seven equally spaced shifting pulses for each pulse received from said OR gate, the spacing of said shifting pulses corresponding to the period between bits in a standard teletypewriter signal, and means to apply said shifting pulses to the shift line of said seven stage register to cause the contents thereof to be serially applied to an output line, said output line being connected to a teletypewriter network; receiving terminal equipment connected to a remote terminal of said teletypewriter network including, means to feed each group of two incoming teletypewriter subcharacters to a shift register for rearrangement of the data therein in parallel eight bit form.

5. A means for transmitting parallel eight bit per character binary code over standard teletypewriter networks, comprising; transmitting terminal equipment including means to split each eight bit character equally between two standard teletypewriter subcharacters, the fifth bit of each subcharacter comprising, a dummy bit, means to provide said teletypewriter characters with standard synchronizing pulses, means to serially apply said teletypewriter subcharacters to a teletypewriter network; receiving terminal equipment at a remote terminal of said teletypewriter network, said equipment including; means to trigger a first one-shot multivibrator with the leading edge of the start pulse of each incoming teletypewriter subcharacter, the pulse length of each first one-shot multivibrator being adjusted to approximately the length of five and one-half teletypewriter bits, means to connect the output of said first multivibrator conjointly to the inputs of a first AND gate, a second one-shot multivibrator and an inverter circuit, said second one-shot multivibrator being arranged to be triggered by the leading edge of the output of the first one-shot multivibrator and being adjusted to produce a pulse slightly shorter than one teletypewriter bit, a connection between the output of said second one-shot multivibrator and one input of an OR gate, the output of said OR gate forming the second input of said first AND gate, the output of said first AND gate being arranged to trigger a third one-shot multivibrator having a pulse length substantially less than the teletypewriter bit length, the pulse lengths of said second and third one-shot multivibrators having a combined duration of approximately one teletypewriter bit, means to trigger a fourth one-shot multivibrator by means of the trailing edge of the output of the third one-shot multivibrator, the output pulse of said fourth one-shot multivibrator being slightly shorter than a teletypewriter bit, the output of said fourth one-shot multivibrator being conjointly connected to one input of a second AND gate and a second input of said OR gate, the second input of said second AND gate being the teletypewriter line signal, the output of said second AND gate being connected to the first stage of a ten stage shift register, the output of said third one-shot multivibrator being applied to the shift line of said shift register, the set output of said first reigster stage being connected to a first input of a third AND gate, the reset output of said sixth register being connected to a second input of said third AND gate, the output of said inverter circuit being connected to a third input of said third AND gate, the remaining eight stages of said shift register having one output connected to one input of a separate one of said eight AND gates, the output of said third AND gate being arranged to trigger a fifth one-shot multivibrator, the output of which is connected to the second input of each of said eight AND gates, the output of said fifth one-shot multivibrator being arranged to trigger a sixth one-shot multivibrator, the output of which is connected to the reset line of said shift register, and means to extract the original eight bit code in parallel form from the outputs of said eight AND gates.

References Cited by the Examiner

UNITED STATES PATENTS 3,051,940 8/1962 Fleckenstein ------- 178—26.5

NEIL C. READ, *Primary Examiner.*

THOMAS B. HABECKER, *Examiner.*